US012684117B2

(12) United States Patent
Zhao et al.

(10) Patent No.: US 12,684,117 B2
(45) Date of Patent: Jul. 14, 2026

(54) WIDE ANGULAR INTRA PREDICTION

(71) Applicant: Tencent America LLC, Palo Alto, CA (US)

(72) Inventors: Liang Zhao, Palo Alto, CA (US); Madhu Peringassery Krishnan, Palo Alto, CA (US); Xin Zhao, Palo Alto, CA (US); Jing Ye, Palo Alto, CA (US); Han Gao, Palo Alto, CA (US); Yushin Cho, Palo Alto, CA (US); Tianqi Liu, Palo Alto, CA (US); Shan Liu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 169 days.

(21) Appl. No.: 18/815,671

(22) Filed: Aug. 26, 2024

(65) Prior Publication Data

US 2025/0274582 A1     Aug. 28, 2025

Related U.S. Application Data

(60) Provisional application No. 63/557,434, filed on Feb. 23, 2024.

(51) Int. Cl.
*H04N 19/11* (2014.01)
*H04N 19/136* (2014.01)
*H04N 19/176* (2014.01)
*H04N 19/184* (2014.01)
*H04N 19/186* (2014.01)
*H04N 19/593* (2014.01)

(52) U.S. Cl.
CPC .......... *H04N 19/11* (2014.11); *H04N 19/136* (2014.11); *H04N 19/176* (2014.11); *H04N 19/184* (2014.11); *H04N 19/186* (2014.11); *H04N 19/593* (2014.11)

(58) Field of Classification Search
CPC .... H04N 19/11; H04N 19/136; H04N 19/176; H04N 19/184; H04N 19/186; H04N 19/593
USPC ..................................... 375/240.02
See application file for complete search history.

(56) References Cited

U.S. PATENT DOCUMENTS

2008/0107178 A1*   5/2008   Han ..................... H04N 19/159
                                                    375/E7.17

* cited by examiner

*Primary Examiner* — Nguyen T Truong
(74) *Attorney, Agent, or Firm* — Morgan, Lewis & Bockius LLP

(57) ABSTRACT

An example method of video decoding includes receiving a video bitstream comprising a plurality of blocks, including a current block. The method also includes identifying a set of intra prediction angles for the current block, where the set of intra prediction angles corresponds to a first range of angles, and mapping the set of intra prediction angles to a set of adjusted prediction angles based on a shape of a prediction block for the current block, where the set of adjusted prediction angles corresponds to a second range of angles outside of the first range of angles. The method further includes reconstructing the current block based on the adjusted prediction angles.

20 Claims, 8 Drawing Sheets

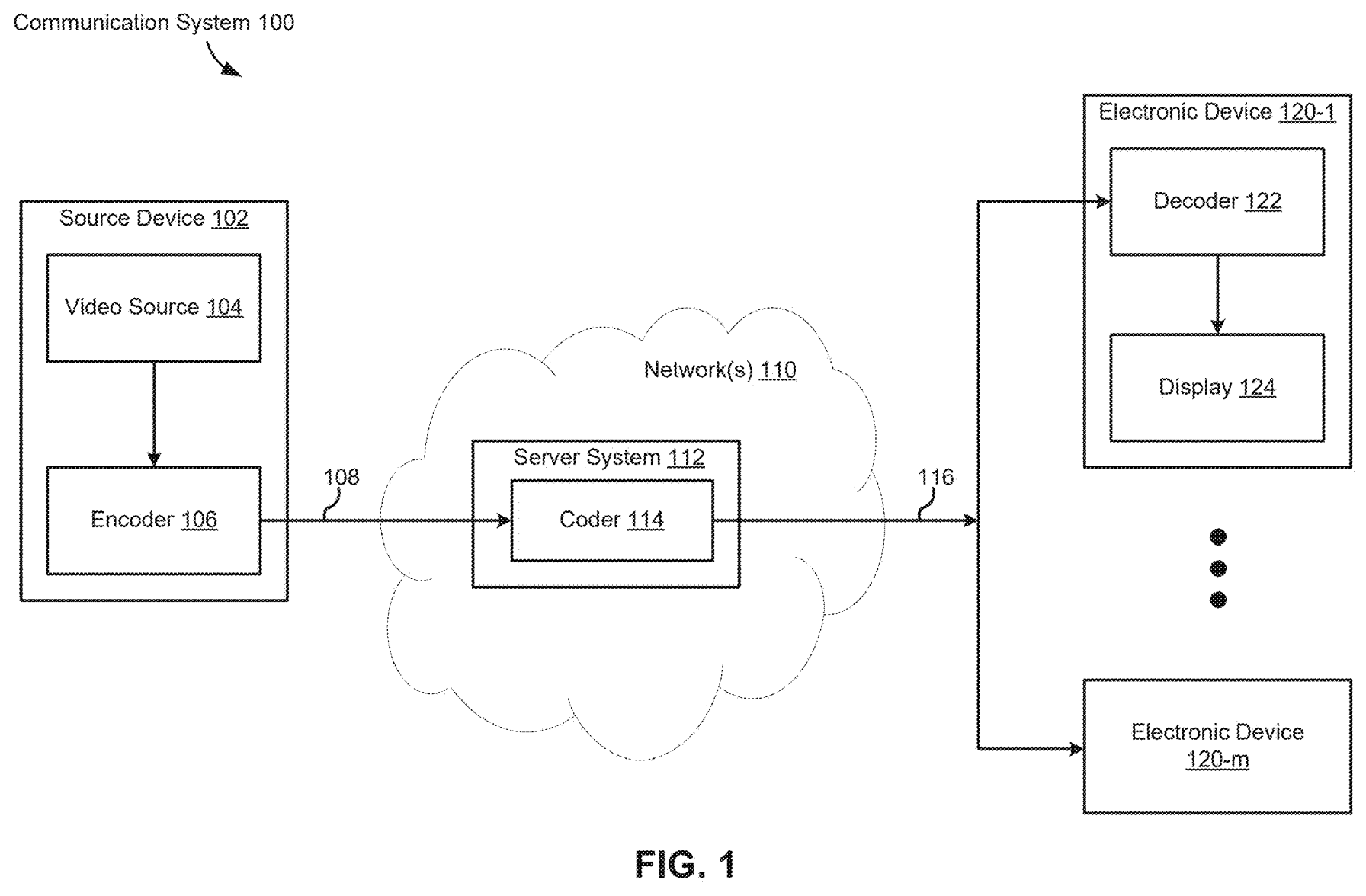

Communication System 100

Source Device 102

Video Source 104

Encoder 106

108

Network(s) 110

Server System 112

Coder 114

116

Electronic Device 120-1

Decoder 122

Display 124

Electronic Device 120-m

FIG. 1

Server System
112

Memory 314

Operating System 316

Network Communication Module 318

Coding Module 320

Decoding Module 322

Parsing Module 324

Transform Module 326

Prediction Module 328

Filter Module 330

Encoding Module 340

Code Module 342

Prediction Module 344

Picture Memory 352

Control Circuitry 302

312

User Interface 306

Output Device(s) 308

Input Device(s) 310

Network Interface(s) 304

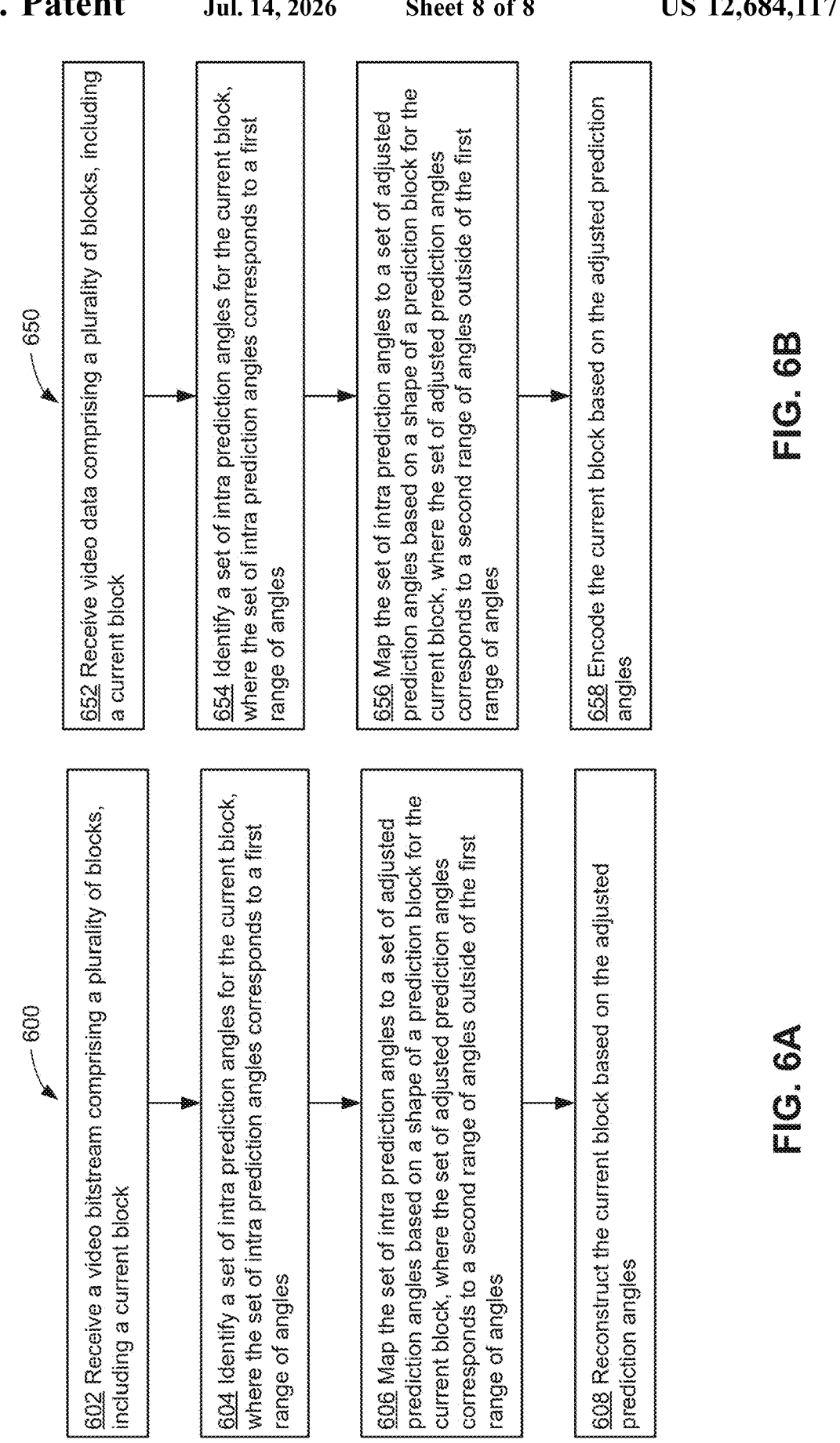

650

652 Receive video data comprising a plurality of blocks, including a current block 654 Identify a set of intra prediction angles for the current block, where the set of intra prediction angles corresponds to a first range of angles 656 Map the set of intra prediction angles to a set of adjusted prediction angles based on a shape of a prediction block for the current block, where the set of adjusted prediction angles corresponds to a second range of angles outside of the first range of angles 658 Encode the current block based on the adjusted prediction angles

602 Receive a video bitstream comprising a plurality of blocks, including a current block 604 Identify a set of intra prediction angles for the current block, where the set of intra prediction angles corresponds to a first range of angles 606 Map the set of intra prediction angles to a set of adjusted prediction angles based on a shape of a prediction block for the current block, where the set of adjusted prediction angles corresponds to a second range of angles outside of the first range of angles 608 Reconstruct the current block based on the adjusted prediction angles

FIG. 6A

WIDE ANGULAR INTRA PREDICTION

RELATED APPLICATIONS

This application claims priority to U.S. Provisional Patent Application No. 63/557,434, entitled "Wide Angular Intra Prediction," filed Feb. 23, 2024, which is hereby incorporated by reference in its entirety.

TECHNICAL FIELD

The disclosed embodiments relate generally to video coding, including but not limited to systems and methods for video coding with intra prediction modes.

BACKGROUND

Digital video is supported by a variety of electronic devices, such as digital televisions, laptop or desktop computers, tablet computers, digital cameras, digital recording devices, digital media players, video gaming consoles, smart phones, video teleconferencing devices, video streaming devices, etc. The electronic devices transmit and receive or otherwise communicate digital video data across a communication network, and/or store the digital video data on a storage device. Due to a limited bandwidth capacity of the communication network and limited memory resources of the storage device, video coding may be used to compress the video data according to one or more video coding standards before it is communicated or stored. The video coding can be performed by hardware and/or software on an electronic/client device or a server providing a cloud service.

Video coding generally utilizes prediction methods (e.g., inter-prediction, intra-prediction, or the like) that take advantage of redundancy inherent in the video data. Video coding aims to compress video data into a form that uses a lower bit rate, while avoiding or minimizing degradations to video quality. Multiple video codec standards have been developed. For example, High-Efficiency Video Coding (HEVC/H.265) is a video compression standard designed as part of the MPEG-H project. ITU-T and ISO/IEC published the HEVC/H.265 standard in 2013 (version 1), 2014 (version 2), 2015 (version 3), and 2016 (version 4). Versatile Video Coding (VVC/H.266) is a video compression standard intended as a successor to HEVC. ITU-T and ISO/IEC published the VVC/H.266 standard in 2020 (version 1) and 2022 (version 2). AOMedia Video 1 (AV1) is an open video coding format designed as an alternative to HEVC. On Jan. 8, 2019, a validated version 1.0.0 with Errata 1 of the specification was released.

SUMMARY

The present disclosure describes amongst other things, a set of methods for video (image) compression, more specifically related to intra mode predictions. As discussed in detail below, intra predictions make use of spatial correlations within a single picture. Directional intra prediction modes use a prediction angle to identify a reference sample. However, in some instances, the reference sample indicated by the prediction angle is unavailable (e.g., not yet decoded or decoded but not stored). To address the issue with unavailable reference samples, systems and methods for mapping intra prediction angles are disclosed herein. Mapping intra prediction angles corresponding to unavailable reference samples to adjusted angles with available reference samples improves the coding accuracy and efficiency.

In accordance with some embodiments, a method of video decoding includes: (i) receiving a video bitstream (e.g., a source video sequence) comprising a plurality of blocks (e.g., corresponding to one or more pictures) including a current block; (ii) identifying a set of intra prediction angles for the current block, where the set of intra prediction angles corresponds to a first range of angles; (iii) mapping the set of intra prediction angles to a set of adjusted prediction angles based on a shape of a prediction block for the current block, where the set of adjusted prediction angles corresponds to a second range of angles outside of the first range of angles; and (iv) reconstructing the current block based on the adjusted prediction angles.

In accordance with some embodiments, a method of video encoding includes (i) receiving video data (e.g., a source video sequence) comprising a plurality of blocks (e.g., corresponding to one or more pictures) including a first block; (ii) identifying a set of intra prediction angles for the current block, where the set of intra prediction angles corresponds to a first range of angles; (iii) mapping the set of intra prediction angles to a set of adjusted prediction angles based on a shape of a prediction block for the current block, where the set of adjusted prediction angles corresponds to a second range of angles outside of the first range of angles; and (iv) encoding the current block based on the adjusted prediction angles.

In accordance with some embodiments, a method of processing visual media data includes: (i) obtaining a source video sequence that comprises a plurality of frames; and (ii) performing a conversion between the source video sequence and a video bitstream of visual media data according to a format rule. The video bitstream comprises a plurality of blocks, including a current block. The format rule specifies that: (a) a set of intra prediction angles be identified for the current block, where the set of intra prediction angles corresponds to a first range of angles; (b) the set of intra prediction angles be mapped to a set of adjusted prediction angles based on a shape of a prediction block for the current block, where the set of adjusted prediction angles corresponds to a second range of angles outside of the first range of angles; and (c) the current block be decoded based on the adjusted prediction angles.

In accordance with some embodiments, a computing system is provided, such as a streaming system, a server system, a personal computer system, or other electronic device. The computing system includes control circuitry and memory storing one or more sets of instructions. The one or more sets of instructions including instructions for performing any of the methods described herein. In some embodiments, the computing system includes an encoder component and a decoder component (e.g., a transcoder).

In accordance with some embodiments, a non-transitory computer-readable storage medium is provided. The non-transitory computer-readable storage medium stores one or more sets of instructions for execution by a computing system. The one or more sets of instructions including instructions for performing any of the methods described herein.

Thus, devices and systems are disclosed with methods for encoding and decoding video. Such methods, devices, and systems may complement or replace conventional methods, devices, and systems for video encoding/decoding.

The features and advantages described in the specification are not necessarily all-inclusive and, in particular, some additional features and advantages will be apparent to one of ordinary skill in the art in view of the drawings, specification, and claims provided in this disclosure. Moreover, it should be noted that the language used in the specification has been principally selected for readability and instructional purposes and has not necessarily been selected to delineate or circumscribe the subject matter described herein.

BRIEF DESCRIPTION OF THE DRAWINGS

So that the present disclosure can be understood in greater detail, a more particular description can be had by reference to the features of various embodiments, some of which are illustrated in the appended drawings. The appended drawings, however, merely illustrate pertinent features of the present disclosure and are therefore not necessarily to be considered limiting, for the description can admit to other effective features as the person of skill in this art will appreciate upon reading this disclosure.

FIG. 1 is a block diagram illustrating an example communication system in accordance with some embodiments.

FIG. 6A illustrates an example video decoding process in accordance with some embodiments.

FIG. 6B illustrates an example video encoding process in accordance with some embodiments.

In accordance with common practice, the various features illustrated in the drawings are not necessarily drawn to scale, and like reference numerals can be used to denote like features throughout the specification and figures.

DETAILED DESCRIPTION

Figure 2A:
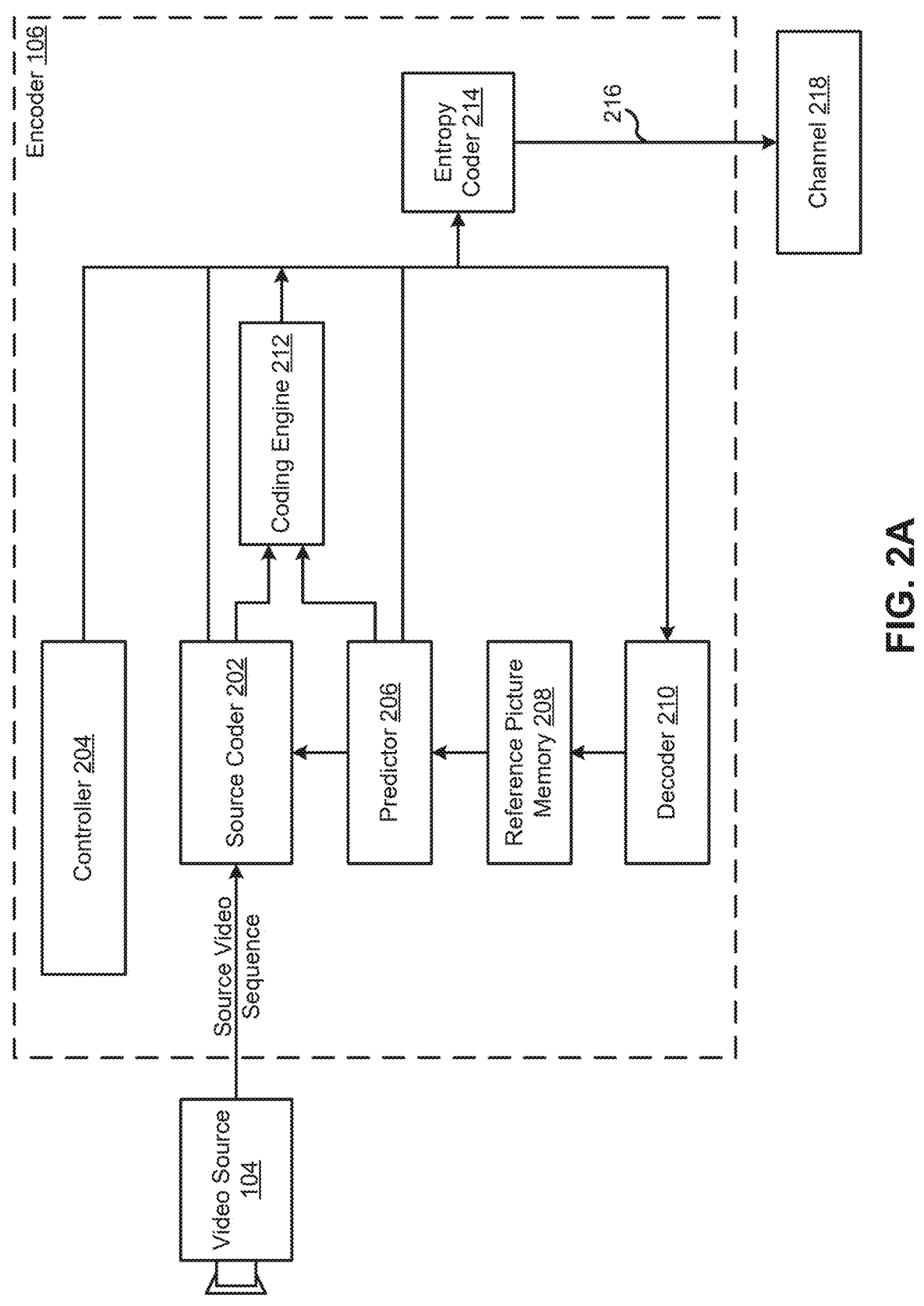
FIG. 2A is a block diagram illustrating example elements of an encoder component in accordance with some embodiments.

The present disclosure describes video/image compression techniques including encoding/decoding video blocks using intra predictions to encode/decode video blocks. For example, after an initial set of one or more intra prediction angles are identified, they can be mapped to a set of adjusted intra prediction angles and the adjusted intra prediction angles can be used to identify available reference samples. The reference samples are then used in the intra prediction process to encode/decode a current sample. Mapping intra prediction angles to adjusted intra prediction angles that correspond to available reference samples improves coding accuracy and efficiency, as illustrated in Table 1. Table 1 below illustrates the improvements to signal-to-noise ratio and coding time based on simulations performed using current designs (e.g., AVM design v6) with various video data (e.g., representing AOM Test Conditions).

TABLE 1

| Simulation Results | | | | |
| --- | --- | --- | --- | --- |
| | Y-PSNR | YUV-PSNR | nVMAF | Enc-time | Dec-time |
| All Intra | −0.08% | −0.08% | −0.17% | 101% | 99% |
| Random Access | −0.04% | −0.04% | −0.19% | 100% | 100% |
| Low Delay | −0.01% | 0.01% | −0.04% | 100% | 99% |

Example Systems and Devices

FIG. 1 is a block diagram illustrating a communication system 100 in accordance with some embodiments. The communication system 100 includes a source device 102 and a plurality of electronic devices 120 (e.g., electronic device 120-1 to electronic device 120-*m*) that are communicatively coupled to one another via one or more networks. In some embodiments, the communication system 100 is a streaming system, e.g., for use with video-enabled applications such as video conferencing applications, digital TV applications, and media storage and/or distribution applications.

The source device 102 includes a video source 104 (e.g., a camera component or media storage) and an encoder component 106. In some embodiments, the video source 104 is a digital camera (e.g., configured to create an uncompressed video sample stream). The encoder component 106 generates one or more encoded video bitstreams from the video stream. The video stream from the video source 104 may be high data volume as compared to the encoded video bitstream 108 generated by the encoder component 106. Because the encoded video bitstream 108 is lower data volume (less data) as compared to the video stream from the video source, the encoded video bitstream 108 requires less bandwidth to transmit and less storage space to store as compared to the video stream from the video source 104. In some embodiments, the source device 102 does not include the encoder component 106 (e.g., is configured to transmit uncompressed video to the network(s) 110).

The one or more networks 110 represents any number of networks that convey information between the source device 102, the server system 112, and/or the electronic devices 120, including for example wireline (wired) and/or wireless communication networks. The one or more networks 110 may exchange data in circuit-switched and/or packet-switched channels. Representative networks include telecommunications networks, local area networks, wide area networks and/or the Internet.

The one or more networks 110 include a server system 112 (e.g., a distributed/cloud computing system). In some embodiments, the server system 112 is, or includes, a streaming server (e.g., configured to store and/or distribute video content such as the encoded video stream from the source device 102). The server system 112 includes a coder component 114 (e.g., configured to encode and/or decode video data). In some embodiments, the coder component 114 includes an encoder component and/or a decoder component. In various embodiments, the coder component 114 is instantiated as hardware, software, or a combination thereof. In some embodiments, the coder component 114 is configured to decode the encoded video bitstream 108 and re-encode the video data using a different encoding standard and/or methodology to generate encoded video data 116. In some embodiments, the server system 112 is configured to generate multiple video formats and/or encodings from the encoded video bitstream 108. In some embodiments, the server system 112 functions as a Media-Aware Network Element (MANE). For example, the server system 112 may be configured to prune the encoded video bitstream 108 for tailoring potentially different bitstreams to one or more of the electronic devices 120. In some embodiments, a MANE is provided separate from the server system 112.

The electronic device 120-1 includes a decoder component 122 and a display 124. In some embodiments, the decoder component 122 is configured to decode the encoded video data 116 to generate an outgoing video stream that can be rendered on a display or other type of rendering device. In some embodiments, one or more of the electronic devices 120 does not include a display component (e.g., is communicatively coupled to an external display device and/or includes a media storage). In some embodiments, the electronic devices 120 are streaming clients. In some embodiments, the electronic devices 120 are configured to access the server system 112 to obtain the encoded video data 116.

The source device and/or the plurality of electronic devices 120 are sometimes referred to as "terminal devices" or "user devices." In some embodiments, the source device 102 and/or one or more of the electronic devices 120 are instances of a server system, a personal computer, a portable device (e.g., a smartphone, tablet, or laptop), a wearable device, a video conferencing device, and/or other type of electronic device.

In example operation of the communication system 100, the source device 102 transmits the encoded video bitstream 108 to the server system 112. For example, the source device 102 may code a stream of pictures that are captured by the source device. The server system 112 receives the encoded video bitstream 108 and may decode and/or encode the encoded video bitstream 108 using the coder component 114. For example, the server system 112 may apply an encoding to the video data that is more optimal for network transmission and/or storage. The server system 112 may transmit the encoded video data 116 (e.g., one or more coded video bitstreams) to one or more of the electronic devices 120. Each electronic device 120 may decode the encoded video data 116 and optionally display the video pictures.

FIG. 2A is a block diagram illustrating example elements of the encoder component 106 in accordance with some embodiments. The encoder component 106 receives video data (e.g., a source video sequence) from the video source 104. In some embodiments, the encoder component includes a receiver (e.g., a transceiver) component configured to receive the source video sequence. In some embodiments, the encoder component 106 receives a video sequence from a remote video source (e.g., a video source that is a component of a different device than the encoder component 106). The video source 104 may provide the source video sequence in the form of a digital video sample stream that can be of any suitable bit depth (e.g., 8-bit, 10-bit, or 12-bit), any colorspace (e.g., BT.601 Y CrCB, or RGB), and any suitable sampling structure (e.g., Y CrCb 4:2:0 or Y CrCb 4:4:4). In some embodiments, the video source 104 is a storage device storing previously captured/prepared video. In some embodiments, the video source 104 is camera that captures local image information as a video sequence. Video data may be provided as a plurality of individual pictures that impart motion when viewed in sequence. The pictures themselves may be organized as a spatial array of pixels, where each pixel can include one or more samples depending on the sampling structure, color space, etc. in use. A person of ordinary skill in the art can readily understand the relationship between pixels and samples.

The encoder component 106 is configured to code and/or compress the pictures of the source video sequence into a coded video sequence 216 in real-time or under other time constraints as required by the application. In some embodiments, the encoder component 106 is configured to perform a conversion between the source video sequence and a bitstream of visual media data (e.g., a video bitstream). Enforcing appropriate coding speed is one function of a controller 204. In some embodiments, the controller 204 controls other functional units as described below and is functionally coupled to the other functional units. Parameters set by the controller 204 may include rate-control-related parameters (e.g., picture skip, quantizer, and/or lambda value of rate-distortion optimization techniques), picture size, group of pictures (GOP) layout, maximum motion vector search range, and so forth. A person of ordinary skill in the art can readily identify other functions of controller 204 as they may pertain to the encoder component 106 being optimized for a certain system design.

In some embodiments, the encoder component 106 is configured to operate in a coding loop. In a simplified example, the coding loop includes a source coder 202 (e.g., responsible for creating symbols, such as a symbol stream, based on an input picture to be coded and reference picture (s)), and a (local) decoder 210. The decoder 210 reconstructs the symbols to create the sample data in a similar manner as a (remote) decoder (when compression between symbols and coded video bitstream is lossless). The reconstructed sample stream (sample data) is input to the reference picture memory 208. As the decoding of a symbol stream leads to bit-exact results independent of decoder location (local or remote), the content in the reference picture memory 208 is also bit exact between the local encoder and remote encoder. In this way, the prediction part of an encoder interprets as reference picture samples the same sample values as a decoder would interpret when using prediction during decoding.

The operation of the decoder 210 can be the same as of a remote decoder, such as the decoder component 122, which is described in detail below in conjunction with FIG. 2B. Briefly referring to FIG. 2B, however, as symbols are available and encoding/decoding of symbols to a coded video sequence by an entropy coder 214 and the parser 254 can be lossless, the entropy decoding parts of the decoder component 122, including the buffer memory 252 and the parser 254 may not be fully implemented in the local decoder 210.

The decoder technology described herein, except the parsing/entropy decoding, may be to be present, in substantially identical functional form, in a corresponding encoder. For this reason, the disclosed subject matter focuses on decoder operation. Additionally, the description of encoder technologies can be abbreviated as they may be the inverse of the decoder technologies.

As part of its operation, the source coder 202 may perform motion compensated predictive coding, which codes an input frame predictively with reference to one or more previously-coded frames from the video sequence that were designated as reference frames. In this manner, the coding engine 212 codes differences between pixel blocks of an input frame and pixel blocks of reference frame(s) that may be selected as prediction reference(s) to the input frame. The controller 204 may manage coding operations of the source coder 202, including, for example, setting of parameters and subgroup parameters used for encoding the video data.

The decoder 210 decodes coded video data of frames that may be designated as reference frames, based on symbols created by the source coder 202. Operations of the coding engine 212 may advantageously be lossy processes. When the coded video data is decoded at a video decoder (not shown in FIG. 2A), the reconstructed video sequence may be a replica of the source video sequence with some errors. The decoder 210 replicates decoding processes that may be performed by a remote video decoder on reference frames and may cause reconstructed reference frames to be stored in the reference picture memory 208. In this manner, the encoder component 106 stores copies of reconstructed reference frames locally that have common content as the reconstructed reference frames that will be obtained by a remote video decoder (absent transmission errors).

The predictor 206 may perform prediction searches for the coding engine 212. That is, for a new frame to be coded, the predictor 206 may search the reference picture memory 208 for sample data (as candidate reference pixel blocks) or certain metadata such as reference picture motion vectors, block shapes, and so on, that may serve as an appropriate prediction reference for the new pictures. The predictor 206 may operate on a sample block-by-pixel block basis to find appropriate prediction references. As determined by search results obtained by the predictor 206, an input picture may have prediction references drawn from multiple reference pictures stored in the reference picture memory 208.

Output of all aforementioned functional units may be subjected to entropy coding in the entropy coder 214. The entropy coder 214 translates the symbols as generated by the various functional units into a coded video sequence, by losslessly compressing the symbols according to technologies known to a person of ordinary skill in the art (e.g., Huffman coding, variable length coding, and/or arithmetic coding).

In some embodiments, an output of the entropy coder 214 is coupled to a transmitter. The transmitter may be configured to buffer the coded video sequence(s) as created by the entropy coder 214 to prepare them for transmission via a communication channel 218, which may be a hardware/software link to a storage device which would store the encoded video data. The transmitter may be configured to merge coded video data from the source coder 202 with other data to be transmitted, for example, coded audio data and/or ancillary data streams (sources not shown). In some embodiments, the transmitter may transmit additional data with the encoded video. The source coder 202 may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and the like.

The controller 204 may manage operation of the encoder component 106. During coding, the controller 204 may assign to each coded picture a certain coded picture type, which may affect the coding techniques that are applied to the respective picture. For example, pictures may be assigned as an Intra Picture (I picture), a Predictive Picture (P picture), or a Bi-directionally Predictive Picture (B Picture). An Intra Picture may be coded and decoded without using any other frame in the sequence as a source of prediction. Some video codecs allow for different types of Intra pictures, including, for example Independent Decoder Refresh (IDR) Pictures. A person of ordinary skill in the art is aware of those variants of I pictures and their respective applications and features, and therefore they are not repeated here. A Predictive picture may be coded and decoded using intra prediction or inter prediction using at most one motion vector and reference index to predict the sample values of each block. A Bi-directionally Predictive Picture may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

The encoder component 106 may perform coding operations according to a predetermined video coding technology or standard, such as any described herein. In its operation, the encoder component 106 may perform various compression operations, including predictive coding operations that exploit temporal and spatial redundancies in the input video sequence. The coded video data, therefore, may conform to a syntax specified by the video coding technology or standard being used.

Figure 2B:
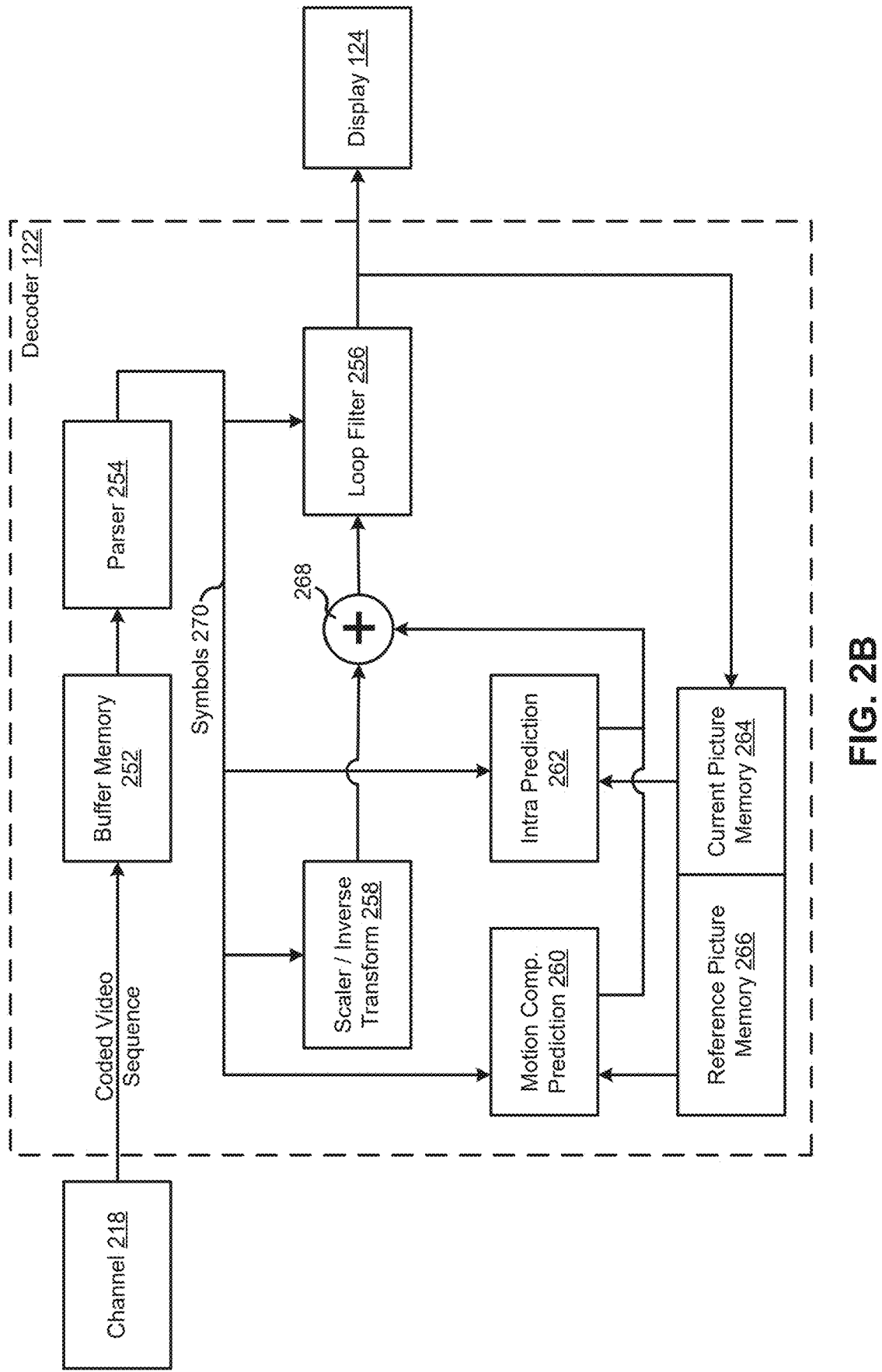
FIG. 2B is a block diagram illustrating example elements of a decoder component in accordance with some embodiments.

FIG. 2B is a block diagram illustrating example elements of the decoder component 122 in accordance with some embodiments. The decoder component 122 in FIG. 2B is coupled to the channel 218 and the display 124. In some embodiments, the decoder component 122 includes a transmitter coupled to the loop filter 256 and configured to transmit data to the display 124 (e.g., via a wired or wireless connection).

In some embodiments, the decoder component 122 includes a receiver coupled to the channel 218 and configured to receive data from the channel 218 (e.g., via a wired or wireless connection). The receiver may be configured to receive one or more coded video sequences to be decoded by the decoder component 122. In some embodiments, the decoding of each coded video sequence is independent from other coded video sequences. Each coded video sequence may be received from the channel 218, which may be a hardware/software link to a storage device which stores the encoded video data. The receiver may receive the encoded video data with other data, for example, coded audio data and/or ancillary data streams, that may be forwarded to their respective using entities (not depicted). The receiver may separate the coded video sequence from the other data. In some embodiments, the receiver receives additional (redundant) data with the encoded video. The additional data may be included as part of the coded video sequence(s). The additional data may be used by the decoder component 122 to decode the data and/or to more accurately reconstruct the original video data. Additional data can be in the form of, e.g., temporal, spatial, or SNR enhancement layers, redundant slices, redundant pictures, forward error correction codes, and so on.

In accordance with some embodiments, the decoder component 122 includes a buffer memory 252, a parser 254 (also sometimes referred to as an entropy decoder), a scaler/inverse transform unit 258, an intra picture prediction unit 262, a motion compensation prediction unit 260, an aggregator 268, the loop filter unit 256, a reference picture memory 266, and a current picture memory 264. In some embodiments, the decoder component 122 is implemented as an integrated circuit, a series of integrated circuits, and/or other electronic circuitry. The decoder component 122 may be implemented at least in part in software.

The buffer memory 252 is coupled in between the channel 218 and the parser 254 (e.g., to combat network jitter). In some embodiments, the buffer memory 252 is separate from the decoder component 122. In some embodiments, a separate buffer memory is provided between the output of the channel 218 and the decoder component 122. In some embodiments, a separate buffer memory is provided outside of the decoder component 122 (e.g., to combat network jitter) in addition to the buffer memory 252 inside the decoder component 122 (e.g., which is configured to handle playout timing). When receiving data from a store/forward device of sufficient bandwidth and controllability, or from an isosynchronous network, the buffer memory 252 may not be needed, or can be small. For use on best effort packet networks such as the Internet, the buffer memory 252 may be required, can be comparatively large and/or of adaptive size, and may at least partially be implemented in an operating system or similar elements outside of the decoder component 122.

The parser 254 is configured to reconstruct symbols 270 from the coded video sequence. The symbols may include, for example, information used to manage operation of the decoder component 122, and/or information to control a rendering device such as the display 124. The control information for the rendering device(s) may be in the form of, for example, Supplementary Enhancement Information (SEI) messages or Video Usability Information (VUI) parameter set fragments (not depicted). The parser 254 parses (entropy-decodes) the coded video sequence. The coding of the coded video sequence can be in accordance with a video coding technology or standard, and can follow principles well known to a person skilled in the art, including variable length coding, Huffman coding, arithmetic coding with or without context sensitivity, and so forth. The parser 254 may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser 254 may also extract, from the coded video sequence, information such as transform coefficients, quantizer parameter values, motion vectors, and so forth.

Reconstruction of the symbols 270 can involve multiple different units depending on the type of the coded video picture or parts thereof (such as: inter and intra picture, inter and intra block), and other factors. Which units are involved, and how they are involved, can be controlled by the subgroup control information that was parsed from the coded video sequence by the parser 254. The flow of such subgroup control information between the parser 254 and the multiple units below is not depicted for clarity.

The decoder component 122 can be conceptually subdivided into a number of functional units, and in some implementations, these units interact closely with each other and can, at least partly, be integrated into each other. However, for clarity, the conceptual subdivision of the functional units is maintained herein.

The scaler/inverse transform unit 258 receives quantized transform coefficients as well as control information (such as which transform to use, block size, quantization factor, and/or quantization scaling matrices) as symbol(s) 270 from the parser 254. The scaler/inverse transform unit 258 can output blocks including sample values that can be input into the aggregator 268. In some cases, the output samples of the scaler/inverse transform unit 258 pertain to an intra coded block; that is: a block that is not using predictive information from previously reconstructed pictures, but can use predictive information from previously reconstructed parts of the current picture. Such predictive information can be provided by the intra picture prediction unit 262. The intra picture prediction unit 262 may generate a block of the same size and shape as the block under reconstruction, using surrounding already-reconstructed information fetched from the current (partly reconstructed) picture from the current picture memory 264. The aggregator 268 may add, on a per sample basis, the prediction information the intra picture prediction unit 262 has generated to the output sample information as provided by the scaler/inverse transform unit 258.

In other cases, the output samples of the scaler/inverse transform unit 258 pertain to an inter coded, and potentially motion-compensated, block. In such cases, the motion compensation prediction unit 260 can access the reference picture memory 266 to fetch samples used for prediction. After motion compensating the fetched samples in accordance with the symbols 270 pertaining to the block, these samples can be added by the aggregator 268 to the output of the scaler/inverse transform unit 258 (in this case called the residual samples or residual signal) so to generate output sample information. The addresses within the reference picture memory 266, from which the motion compensation prediction unit 260 fetches prediction samples, may be controlled by motion vectors. The motion vectors may be available to the motion compensation prediction unit 260 in the form of symbols 270 that can have, for example, X, Y, and reference picture components. Motion compensation may also include interpolation of sample values as fetched from the reference picture memory 266, e.g., when sub-sample exact motion vectors are in use, motion vector prediction mechanisms.

The output samples of the aggregator 268 can be subject to various loop filtering techniques in the loop filter unit 256. Video compression technologies can include in-loop filter technologies that are controlled by parameters included in the coded video bitstream and made available to the loop filter unit 256 as symbols 270 from the parser 254, but can also be responsive to meta-information obtained during the decoding of previous (in decoding order) parts of the coded picture or coded video sequence, as well as responsive to previously reconstructed and loop-filtered sample values.

The output of the loop filter unit 256 can be a sample stream that can be output to a render device such as the display 124, as well as stored in the reference picture memory 266 for use in future inter-picture prediction.

Certain coded pictures, once reconstructed, can be used as reference pictures for future prediction. Once a coded picture is reconstructed and the coded picture has been identified as a reference picture (by, for example, parser 254), the current reference picture can become part of the reference picture memory 266, and a fresh current picture memory can be reallocated before commencing the reconstruction of the following coded picture.

The decoder component 122 may perform decoding operations according to a predetermined video compression technology that may be documented in a standard, such as any of the standards described herein. The coded video sequence may conform to a syntax specified by the video compression technology or standard being used, in the sense that it adheres to the syntax of the video compression technology or standard, as specified in the video compression technology document or standard and specifically in the profiles document therein. Also, for compliance with some video compression technologies or standards, the complexity of the coded video sequence may be within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

Figure 3:
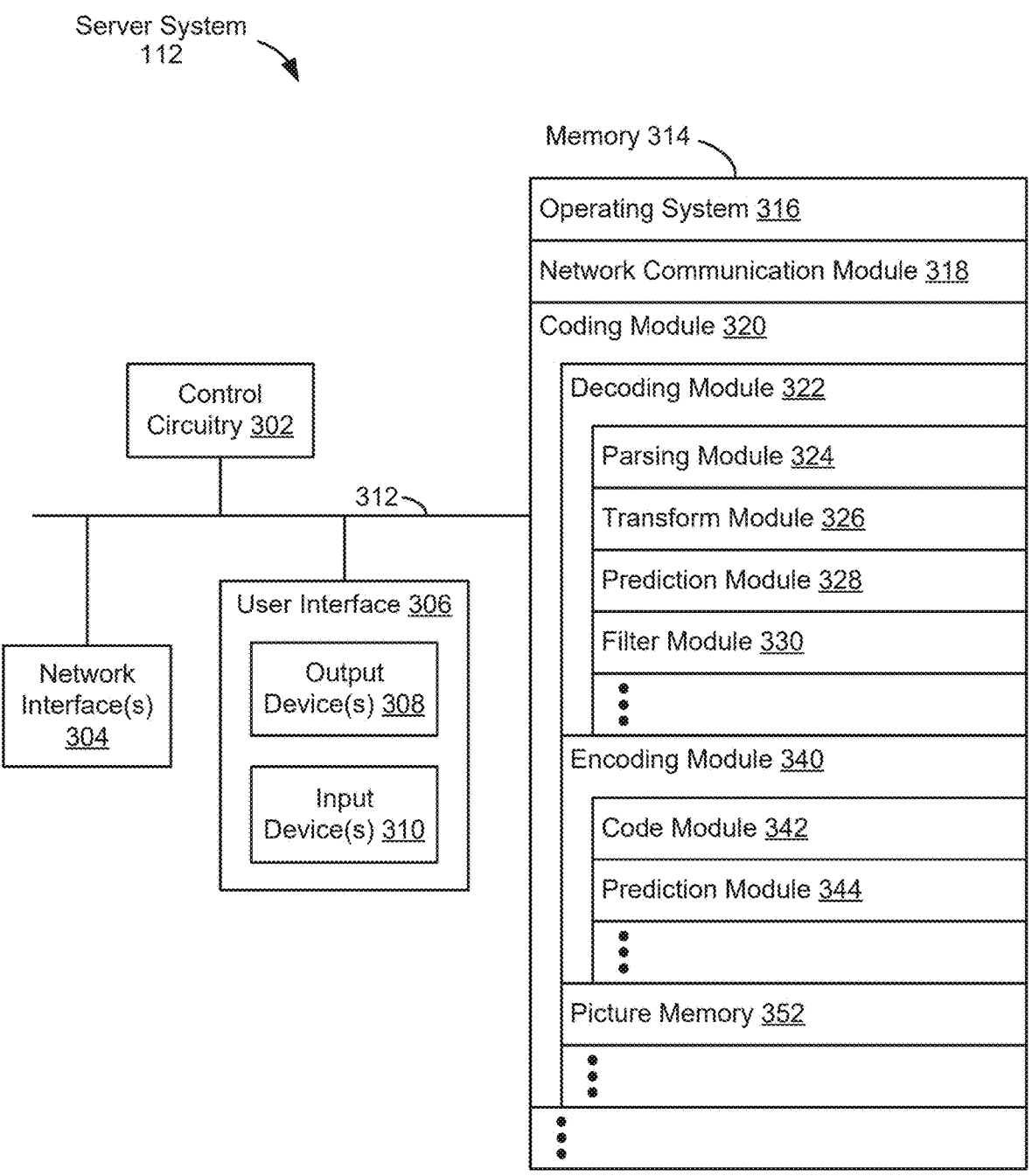
FIG. 3 is a block diagram illustrating an example server system in accordance with some embodiments.

FIG. 3 is a block diagram illustrating the server system 112 in accordance with some embodiments. The server system 112 includes control circuitry 302, one or more network interfaces 304, a memory 314, a user interface 306, and one or more communication buses 312 for interconnecting these components. In some embodiments, the control circuitry 302 includes one or more processors (e.g., a CPU, GPU, and/or DPU). In some embodiments, the control circuitry includes field-programmable gate array(s), hardware accelerators, and/or integrated circuit(s) (e.g., an application-specific integrated circuit).

The network interface(s) 304 may be configured to interface with one or more communication networks (e.g., wireless, wireline, and/or optical networks). The communication networks can be local, wide-area, metropolitan, vehicular and industrial, real-time, delay-tolerant, and so on. Examples of communication networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Such communication can be unidirectional, receive only (e.g., broadcast TV), unidirectional send-only (e.g., CANbus to certain CANbus devices), or bi-directional (e.g., to other computer systems using local or wide area digital networks). Such communication can include communication to one or more cloud computing networks.

The user interface 306 includes one or more output devices 308 and/or one or more input devices 310. The input device(s) 310 may include one or more of: a keyboard, a mouse, a trackpad, a touch screen, a data-glove, a joystick, a microphone, a scanner, a camera, or the like. The output device(s) 308 may include one or more of: an audio output device (e.g., a speaker), a visual output device (e.g., a display or monitor), or the like.

The memory 314 may include high-speed random-access memory (such as DRAM, SRAM, DDR RAM, and/or other random access solid-state memory devices) and/or non-volatile memory (such as one or more magnetic disk storage devices, optical disk storage devices, flash memory devices, and/or other non-volatile solid-state storage devices). The memory 314 optionally includes one or more storage devices remotely located from the control circuitry 302. The memory 314, or, alternatively, the non-volatile solid-state memory device(s) within the memory 314, includes a non-transitory computer-readable storage medium. In some embodiments, the memory 314, or the non-transitory computer-readable storage medium of the memory 314, stores the following programs, modules, instructions, and data structures, or a subset or superset thereof:

- an operating system 316 that includes procedures for handling various basic system services and for performing hardware-dependent tasks;
- a network communication module 318 that is used for connecting the server system 112 to other computing devices via the one or more network interfaces 304 (e.g., via wired and/or wireless connections);
- a coding module 320 for performing various functions with respect to encoding and/or decoding data, such as video data. In some embodiments, the coding module 320 is an instance of the coder component 114. The coding module 320 including, but not limited to, one or more of:
  - a decoding module 322 for performing various functions with respect to decoding encoded data, such as those described previously with respect to the decoder component 122; and
  - an encoding module 340 for performing various functions with respect to encoding data, such as those described previously with respect to the encoder component 106; and
- a picture memory 352 for storing pictures and picture data, e.g., for use with the coding module 320. In some embodiments, the picture memory 352 includes one or more of: the reference picture memory 208, the buffer memory 252, the current picture memory 264, and the reference picture memory 266.

In some embodiments, the decoding module 322 includes a parsing module 324 (e.g., configured to perform the various functions described previously with respect to the parser 254), a transform module 326 (e.g., configured to perform the various functions described previously with respect to the scalar/inverse transform unit 258), a prediction module 328 (e.g., configured to perform the various functions described previously with respect to the motion compensation prediction unit 260 and/or the intra picture prediction unit 262), and a filter module 330 (e.g., configured to perform the various functions described previously with respect to the loop filter 256).

In some embodiments, the encoding module 340 includes a code module 342 (e.g., configured to perform the various functions described previously with respect to the source coder 202 and/or the coding engine 212) and a prediction module 344 (e.g., configured to perform the various functions described previously with respect to the predictor 206). In some embodiments, the decoding module 322 and/or the encoding module 340 include a subset of the modules shown in FIG. 3. For example, a shared prediction module is used by both the decoding module 322 and the encoding module 340.

Each of the above identified modules stored in the memory 314 corresponds to a set of instructions for performing a function described herein. The above identified modules (e.g., sets of instructions) need not be implemented as separate software programs, procedures, or modules, and thus various subsets of these modules may be combined or otherwise re-arranged in various embodiments. For example, the coding module 320 optionally does not include separate decoding and encoding modules, but rather uses a same set of modules for performing both sets of functions. In some embodiments, the memory 314 stores a subset of the modules and data structures identified above. In some embodiments, the memory 314 stores additional modules and data structures not described above.

Although FIG. 3 illustrates the server system 112 in accordance with some embodiments, FIG. 3 is intended more as a functional description of the various features that may be present in one or more server systems rather than a structural schematic of the embodiments described herein. In practice, items shown separately could be combined and some items could be separated. For example, some items shown separately in FIG. 3 could be implemented on single servers and single items could be implemented by one or more servers. The actual number of servers used to implement the server system 112, and how features are allocated among them, will vary from one implementation to another and, optionally, depends in part on the amount of data traffic that the server system handles during peak usage periods as well as during average usage periods.

Example Coding Techniques

The coding processes and techniques described below may be performed at the devices and systems described above (e.g., the source device 102, the server system 112, and/or the electronic device 120). In the following, intra prediction methods and techniques are described.

As used herein, "conventional angles" refers to the prediction angles within the range of 45 degrees and 225 degrees. Additionally, "wide angles" refers to prediction angles that extend beyond the range of 45 degrees to 225 degrees. Thus, the angles located at the top-right of the 45-degree mark (e.g., to the right of D45_PRED in FIG. 5A) and the angles at the bottom-left of the 225-degree mark are classified as wide angles.

As used herein, "intra bi-prediction" refers to a bi-directional intra prediction in which two prediction blocks are generated along a given prediction angle and its opposite prediction angle. After generating two prediction blocks, they are weighted and combined to form final intra prediction samples. In some embodiments, intra bi-prediction is applied to the directional modes that are smaller than 90 degrees or larger than 180 degrees.

Figure 4:
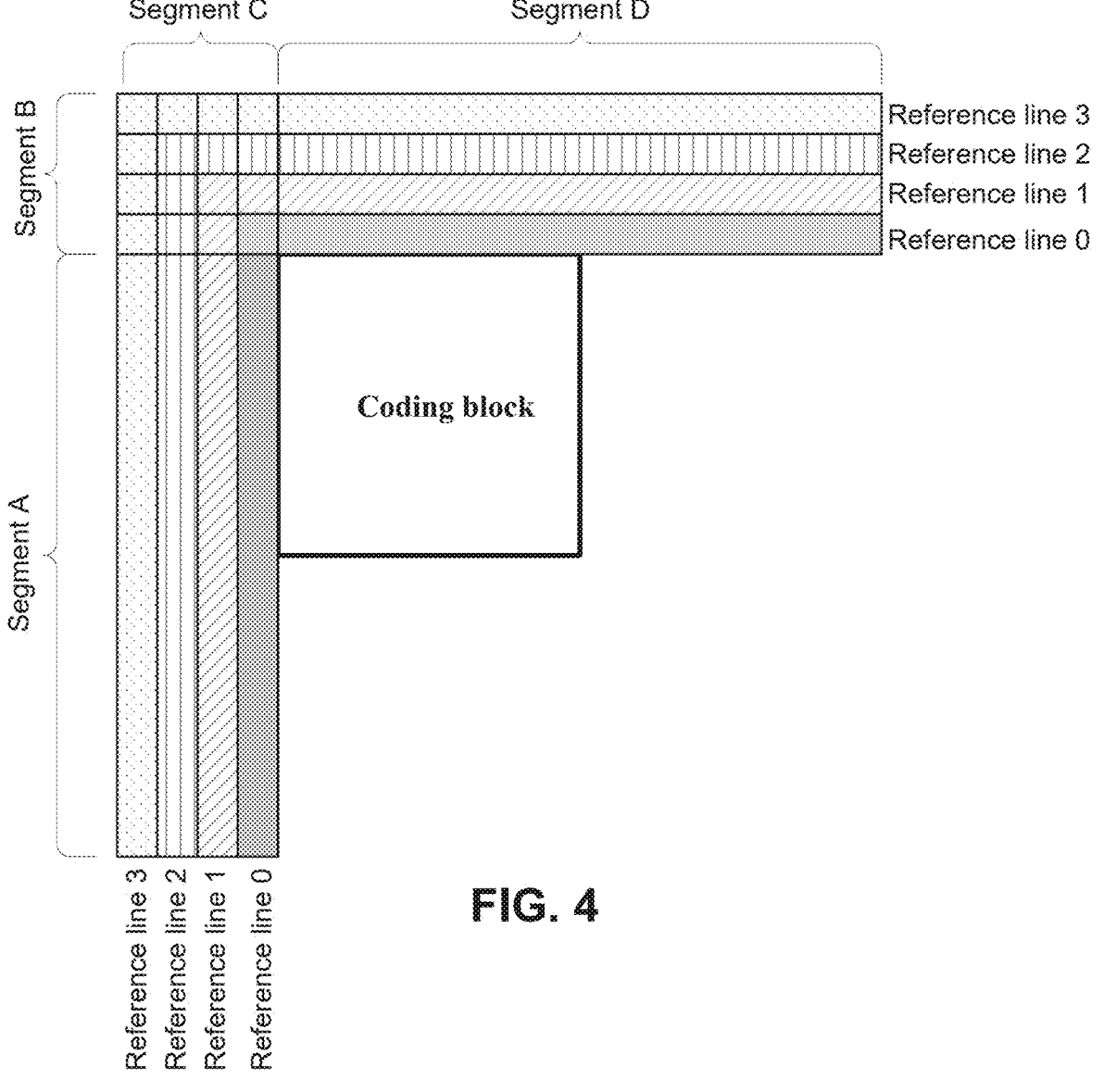
FIG. 4 illustrates example intra prediction scheme based on various reference lines in accordance with some embodiments.

As used herein, a "reference line index" for intra prediction refers to the index of adjacent or non-adjacent neighboring samples for performing intra prediction (e.g., as illustrated in FIG. 4).

FIG. 4 illustrates example intra prediction scheme based on various reference lines in accordance with some embodiments. In FIG. 4, an example of a 4 reference-line based multiple reference line selection (MRLS) is depicted. As shown in the example of FIG. 4, the coding block (e.g., an intra coding block) may be predicted based on one of the four horizontal reference lines (reference lines 0, 1, 2, and 3) and 4 vertical reference lines (reference lines 0, 1, 2, and 3). Among these reference lines, reference line 0 is the immediate neighboring reference line (also referred to as the adjacent reference line). The reference lines may be indexed according to their distance from the coding block. For example, reference line 0 may be referred to as the zero reference line whereas the other reference lines may be referred to as non-zero reference lines.

A reference line index indicates a reference line among multiple reference lines. In some embodiments, the reference line index being 0 for a block indicates that the adjacent reference line to the block is selected. For example, a left reference line with index 0 may refer to the portion of reference line 0 within Segment A (and optionally Segment B) in FIG. 4. Similarly, a top reference line with index 0 may refer to the portion of reference line 0 within Segment D (and optionally Segment C). Continuing the example, a top reference line with index 3 may refer to the portion of reference line 3 within Segment D (and optionally Segment C). The portion of the reference lines in Segments C and D are sometimes referred to as the top-left reference samples.

In some conventional systems (e.g., applying AV1), the intra prediction angles are the same regardless of whether the blocks are square or non-square, which is suboptimal for coding accuracy. This issue may be address by mapping conventional intra prediction angles to wide angles specifically for non-square blocks. For rectangular blocks with varying aspect ratios, different numbers of conventional angular intra prediction modes may be mapped to wide angles. In addition, the intra mode coding may be unchanged by the mapping.

Figure 5A:
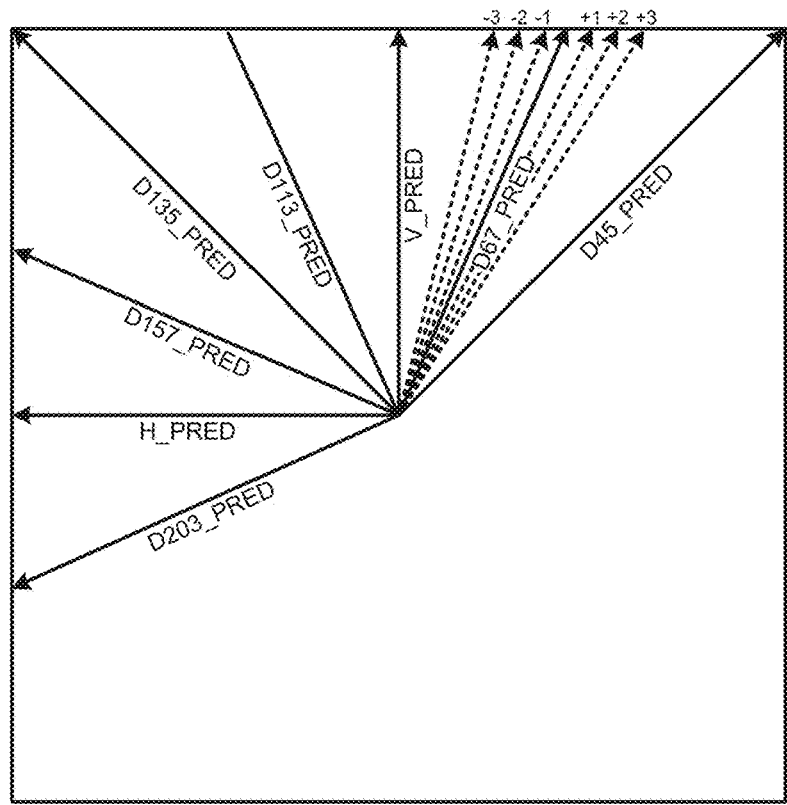
FIG. 5A illustrates example intra prediction angles in accordance with some embodiments.

Some conventional systems include 56 directional intra prediction modes for each reference line. There may be eight nominal directional intra prediction modes, each of which has an associated set of angle delta offsets ranging from −3 to +3. FIG. 5A shows eight nominal modes indicated by solid arrows (labeled D203_PRED, H_PRED, D157_PRED, D135_PRED, V_PRED, D67_PRED, and D45_PRED) with an example of the set of angle delta offsets around the D67_PRED nominal mode as indicated by the dotted arrows (e.g., for +3, +2, +1, −1, −2, and −3 offsets).

Figure 5B:
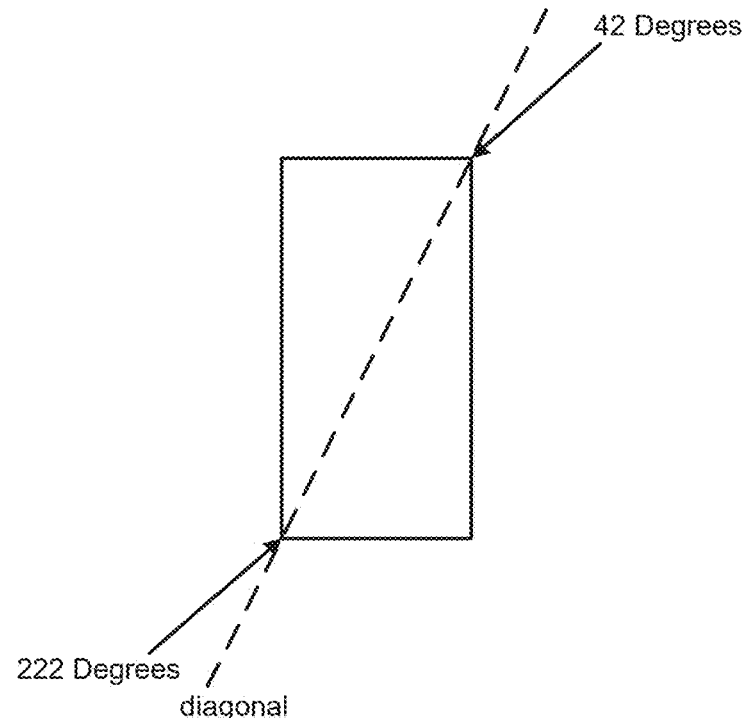
FIGS. 5B-5C illustrate example wide angle mapping for non-square blocks in accordance with some embodiments.
Figure 5C:
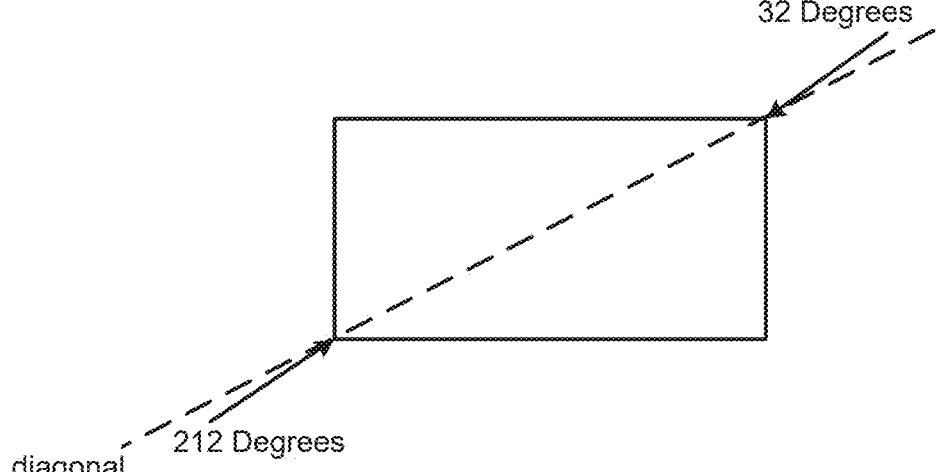

FIGS. 5B-5C illustrate example wide angle mapping for non-square blocks in accordance with some embodiments. In accordance with some embodiments, if the prediction angle is beyond the diagonal direction of the prediction block, it is mapped to wide angles (e.g., by adding 180 degrees for non-square tall blocks, or subtracting 180 degrees for non-square flat blocks respectively). In this way, the value of prediction angle may be changed from top-right corner to bottom-left corner and vice versa. FIG. 5A shows an example with an angle of 42 degrees located at top-right corner for a tall rectangular block that is beyond the diagonal direction of this block. Adding 180 degrees to 42 degrees yields 222 degrees, which serves as the mapped angle used for intra prediction in this example. FIG. 5B shows a similar example for a flat rectangle block in which an angle of 212 degrees is beyond the diagonal direction of the block and is mapped to an adjusted angle of 32 degrees.

In order to determine whether a prediction angle is beyond the diagonal direction, the corresponding tangent value of the given angle may be stored in a look-up table (e.g., the existing look-up table, dr_intra_derivative) and may be compared with 32, 16, 8, and 4. This comparison may be made for block width/height ratios of 2 (or ½), 4 (or ¼), 8 (or ⅛), and 16 (or 1⁄16). If the tangent value is greater than these thresholds, it indicates the angle may need to be mapped to a wider angle. Table 2 below lists example conditions on which initial angles (p_angle) are mapped to wide angles for various rectangular block shapes.

TABLE 2

| Example Mapping Conditions | | |
| --- | --- | --- |
| Block Shape | Conditions for Mapping | Mapped Angle |
| Height/Width (H/W) = 2 | p_angle < 61 | p_angle += 180 |
| H/W = 4 | p_angle < 73 | p_angle += 180 |
| H/W = 8 | p_angle < 82 | p_angle += 180 |
| H/W = 16 | p_angle < 86 | p_angle += 180 |
| H/W = 1/2 | p_angle > 270 − 61 | p_angle −= 180 |
| H/W = 1/4 | p_angle > 270 − 73 | p_angle −= 180 |
| H/W = 1/8 | p_angle > 270 − 82 | p_angle −= 180 |
| H/W = 1/16 | p_angle > 270 − 86 | p_angle −= 180 |

In some embodiments, a bi-prediction is used to further exploit the correlation with neighboring pixels. In a bi-prediction mode, for each directional mode, two reference pixels along the direction are weighted combined to achieve the predictor. The pixel-wise DC predictor may be derived with the traditional DC (average of neighboring pixels) and the above/left adjacent reference pixel. The weights may be fixed depending on mode, block-size and distance from reference pixels.

In some embodiments, intra bi-prediction is applied to the directional modes that are smaller than 90 degree or larger than 180 degree and the DC mode. The prediction for a sample (e.g., a pixel at an (x, y) location) may be generated with a weighted combination of two predictors (e.g., denoted A and B) along opposite ends of a prediction angle. For example, the prediction for the sample may be determined using Equation 1 below.

Intra Bi-Prediction $$pred(x, y) = w * A + (1 - w) * B \qquad \text{Equation 1}$$

In Equation 1, w denotes the weight, which may be fixed for a mode, block-size and distances from reference pixels.

FIG. 6A is a flow diagram illustrating a method 600 of decoding video in accordance with some embodiments. The method 600 may be performed at a computing system (e.g., the server system 112, the source device 102, or the electronic device 120) having control circuitry and memory storing instructions for execution by the control circuitry. In some embodiments, the method 600 is performed by executing instructions stored in the memory (e.g., the memory 314) of the computing system.

The system receives (602) a video bitstream (e.g., a coded video sequence) comprising a plurality of blocks (e.g., corresponding to a set of pictures) including a current block. The system identifies (604) a set of intra prediction angles for the current block, where the set of intra prediction angles corresponds to a first range of angles. In some embodiments, the set of intra prediction angles for the current block are signaled in the video bitstream. In some embodiments, the set of intra prediction angles are derived (e.g., based on one or more neighboring blocks). The system maps (606) the set of (one or more) intra prediction angles to a set of (one or more) adjusted prediction angles based on a shape of a prediction block for the current block, where the set of adjusted prediction angles corresponds to a second range of angles outside of the first range of angles. In some embodiments, mapping the set of intra prediction angles comprises inputting the set of intra prediction angles into a formula/function to obtain the adjusted prediction angles. In some embodiments, mapping the set of intra prediction angles comprises inputting the set of intra prediction angles into a look-up table. The system reconstructs (608) the current block based on the adjusted prediction angles. In this way, the intra prediction angles within the range between 45 degrees and 225 degrees may be mapped to wide angles based on the block shape of the prediction block. In addition, the wide angles beyond the range of 45 degrees and 225 degrees may be mapped to the prediction angles within the range of 45 degrees and 225 degrees.

In some embodiments, for a square block, the 3 positive delta angles located at the right-hand (or clock-wise) side of 45 degrees nominal angle (sometimes referred to as D45_PRED) are mapped to the conventional angles which are located at the bottom-left to the 203 degrees nominal angle (sometimes referred to as D203_PRED) and its delta angles.

In some embodiments, the related nominal angle for these 3 delta angles is also mapped to D203_PRED for primary and/or secondary transform related operations (e.g., transform kernel selection or context derivation for entropy coding of transform related syntaxes). In some embodiments, the primary and/or secondary transforms are grouped into sets with corresponding set indices and kernel indices within a set, and the related nominal angle for these 3 delta angles is mapped to a set index for primary and/or secondary transform related operations.

In some embodiments, for a tall non-square block (height>width), the angles smaller than 90 degrees are mapped to bottom-left of the 203 degrees, and their related nominal angles are mapped to 203 degrees nominal angle (also named as D203_PRED) or a set index for primary and/or secondary transform related operations.

In some embodiments, for a flat non-square block (height<width), the angles greater than 180 degrees are mapped to top-right of the 45 degrees, and their related nominal angles are mapped to 45 degrees nominal angle (also called as D45_PRED) or a set index for primary and/or secondary transform related operations.

In some embodiments, the parity of the delta angles to the nominal intra prediction mode is kept unchanged when mapping from conventional angles to wide angles or mapping from wide angles to conventional angles. In some embodiments, the parity of the delta angles is used for the determination of whether to apply an intra bi-prediction.

In some embodiments, (e.g., for mapped wide angles or conventional angles) the weighting factors (used as the weights for different reference samples when performing intra bi-prediction) of the nearest conventional angle are used for combining two prediction blocks.

In some embodiments, the intra prediction angle mapping process only applies to luma color component and not to chroma components. For example, when luma is using a wide angle, the associated chroma color component (if the same intra prediction angle is applied) applies the conventional intra prediction angle without mapping for performing intra prediction.

In some embodiments, the weighting factors of the original angle before mapping process are negated and used for the mapped angle.

In some embodiments, an intra bi-prediction is not enabled for (applied to) the mapped wide angles.

In some embodiments, an intra bi-prediction is applied on mapped wide angles, but the reference samples used to perform intra bi-prediction are limited to be a given range of top and left reference samples. For example, only the top W (width of the current transform block) and top right W, left H (height of the current transform block) and bottom left H samples may be used for performing intra bi-prediction, and whenever a reference sample located outside the above range is to be fetched, the position is clipped by the above range.

In some embodiments, the prediction angle mapping process is only applied to the reference samples located at the adjacent reference line (e.g., reference line 0 in FIG. 4). In some embodiments, the prediction angle mapping process is be applied to certain block sizes.

In some embodiments, a high-level syntax (such as a sequence level, frame level, or slice level syntax) is signaled to indicate whether the wide angle mapping process is allowed.

Code snippet 1 below illustrates an example for mapping the angles to a set of adjusted angles:

---

Code Snippet 1 - Angle Mapping

---

```
if (is_directional_mode) {
    const int angle_delta =
        mbmi->angle_delta[plane != AOM_PLANE_Y] *
        ANGLE_STEP;
    p_angle = mode_to_angle_map[mode] + angle_delta;
    const int mrl_index_to_delta[4] = { 0, 1, −1, 0 };
    p_angle += mrl_index_to_delta[mrl_index];
    assert(p_angle > 0 && p_angle < 270);
    if ((txhpx == txwpx && p_angle < 45) ||
        (txhpx == 2 * txwpx && p_angle < 61) ||
        (txhpx == 4 * txwpx && p_angle < 73) ||
          (txhpx == 8 * txwpx && p_angle < 82) ||
          (txhpx == 16 * txwpx && p_angle < 86)) {
        p_angle = 180 + p_angle;
        mbmi->is_wide_angle[plane > 0] = 1;
        mbmi->mapped_intra_mode[plane > 0] = D203_PRED;
    } else if ((txwpx == 2 * txhpx && p_angle > 270 − 61) ||
          (txwpx == 4 * txhpx && p_angle > 270 − 73) ||
          (txwpx == 8 * txhpx && p_angle > 270 − 82) ||
          (txwpx == 16 * txhpx && p_angle > 270 − 86)) {
        p_angle = p_angle − 180;
        mbmi->is_wide_angle[plane > 0] = 1;
        mbmi->mapped_intra_mode[plane > 0] = D45_PRED;
    }
}
```

---

FIG. 6B is a flow diagram illustrating a method 650 of encoding video in accordance with some embodiments. The method 650 may be performed at a computing system (e.g., the server system 112, the source device 102, or the electronic device 120) having control circuitry and memory storing instructions for execution by the control circuitry. In some embodiments, the method 650 is performed by executing instructions stored in the memory (e.g., the memory 314) of the computing system. In some embodiments, the method 650 is performed by a same system as the method 600 described above.

The system receives (652) video data (e.g., a source video sequence) comprising a plurality of blocks (e.g., corresponding to a set of pictures) including a current block. The system identifies (654) a set of intra prediction angles for the current block, where the set of intra prediction angles corresponds to a first range of angles. The system maps (656) the set of intra prediction angles to a set of adjusted prediction angles based on a shape of a prediction block for the current block, where the set of adjusted prediction angles corresponds to a second range of angles outside of the first range of angles. The system encodes (658) the current block based on the adjusted prediction angles. As described previously, the encoding process may mirror the decoding processes described herein (e.g., deriving the adjusted prediction angles). For brevity, those details are not repeated here.

Although FIGS. 6A and 6B illustrate a number of logical stages in a particular order, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that the stages could be implemented in hardware, firmware, software, or any combination thereof.

Turning now to some example embodiments.

(A1) In one aspect, some embodiments include a method (e.g., the method 500) of video decoding. In some embodiments, the method is performed at a computing system (e.g., the server system 112) having memory and control circuitry. In some embodiments, the method is performed at a coding module (e.g., the coding module 320). In some embodiments, the method is performed at a source coding component (e.g., the source coder 202), a coding engine (e.g., the coding engine 212), and/or an entropy coder (e.g., the entropy coder 214). The method includes (i) receiving a video bitstream (e.g., a coded video sequence) including a current block; (ii) identifying a set of intra prediction angles for the current block, where the set of intra prediction angles corresponds to a first range of angles; (iii) mapping the set of intra prediction angles to a set of adjusted prediction angles based on a shape of a prediction block for the current block, where the set of adjusted prediction angles corresponds to a second range of angles outside of the first range of angles; and (iv) reconstructing the current block based on the adjusted prediction angles. For example, the intra prediction angles within the range between 45 degrees and 225 degrees may be mapped to wide angles based on the block shape of the prediction block. In addition, the wide angles beyond the range of 45 degrees and 225 degrees may be mapped to the prediction angles within the range of 45 degrees and 225 degrees. In some embodiments, the current block is reconstructed based on the adjusted prediction angles and coded information from the video bitstream.

(A2) In some embodiments of A1, the method further includes, when the current block has a non-square shape, mapping a nominal angle for the set of intra prediction angles to an adjusted nominal angle within the first range of angles. In some embodiments, in accordance with a determination that the current block has a non-square shape, a nominal angle for the set of intra prediction angles is mapped to an adjusted nominal angle within the first range of angles.

(A3) In some embodiments of A2, the current block has a height that is greater than a width of the current block, the first range of angles corresponds to angles less than 90 degrees, and the second range of angles corresponds to angles greater than 203 degrees. For example, for tall non-square block (height>width), the angles smaller than 90 degrees may be mapped to bottom-left of the 203 degrees, and their related nominal angles are mapped to 203 degrees nominal angle (sometimes referred to as D203_PRED) or a set index for primary and/or secondary transform related operations. For example, a tall non-square block may be a block whose height is more than 2× its width (e.g., a height of 16 and a width of 4). In some embodiments, the adjusted nominal angle is a predetermined angle (e.g., the 203- degree angle). In some embodiments, the set of intra prediction angles comprises one or more intra prediction angles.

(A4) In some embodiments of A2, the current block has a width that is greater than a height of the current block, the first range of angles corresponds to angles greater than 180 degrees, and the second range of angles corresponds to angles less than 45 degrees. For example, for flat non-square block (height<width), the angles greater than 180 degrees may be mapped to top-right of the 45 degrees, and their related nominal angles are mapped to 45 degrees nominal angle (sometimes referred to as D45_PRED) or a set index for primary and/or secondary transform related operations.

(A5) In some embodiments of any of A2-A4, a parity corresponding to the nominal angle is unchanged by the mapping. For example, the parity of the delta angles to the nominal intra prediction mode is kept unchanged when mapping from conventional angles to wide angles or mapping from wide angles to conventional angles. In some embodiments, the current block is reconstructed based on the adjusted nominal angle and the (original) parity corresponding to the nominal angle.

(A6) In some embodiments of A5, the method further includes determining whether to apply an intra bi-prediction for the current block based on the parity corresponding to the nominal angle. For example, the parity of the delta angles may be used for the determination of applying intra bi-prediction or not.

(A7) In some embodiments of A6, the method further includes identifying a set of weighting factors based on one or more angles outside of the second range of angles, where the current block is reconstructed using the intra bi-prediction and the set of weighting factors. For example, for the mapped angles, the weighting factors (used as the weights for different reference samples when performing intra bi-prediction) of the nearest conventional angle may be used for combining two prediction blocks.

(A8) In some embodiments of any of A1-A7, the set of intra prediction angles correspond to a luma component of the current block, and a chroma component of the current block is reconstructed without mapping any intra prediction angles. For example, the intra prediction angle mapping process only applies to a luma color component and is not applied to a chroma component. That is, when luma is using a wide angle, the associated chroma color component (if the same intra prediction angle is applied) is applying the conventional intra prediction angle without mapping for performing intra prediction.

(A9) In some embodiments of any of A1-A8, the method further includes: (i) identifying a set of weighting factors for the set of intra prediction angles; and (ii) applying the set of weighting factors to the set of adjusted prediction angles. For example, the weighting factors of its original angle before mapping process may be negated and used for mapped angle.

(A10) In some embodiments of any of A1-A9, an intra bi-prediction mode is disabled for the set of adjusted prediction angles. For example, intra bi-prediction is not applied to the mapped wide angles.

(A11) In some embodiments of any of A1-A9, reconstructing the current block based on the adjusted prediction angles comprises applying an intra bi-prediction for the current block using the adjusted prediction angles and reference samples within the current block.

For example, intra bi-prediction is applied on mapped wide angles, but the reference samples used to perform intra bi-prediction are limited to be a given range of top and left reference samples, e.g., only top W (width of the current transform block) and top right W, left H (height of the current transform block) and bottom left H samples can be used for performing intra bi-prediction, whenever a reference sample located outside the above range is to be fetched, the position is clipped by the above range.

(A12) In some embodiments of any of A1-A11: (i) the mapping is performed when an adjacent reference is used to reconstruct the current block; and (ii) the mapping is not performed when a non-adjacent reference is used to reconstruct the current block. For example, the prediction angle mapping process may only be applied to the reference samples located at the adjacent reference line. In some embodiments, the mapping is performed in accordance with a determination that an adjacent reference is used to be used to reconstruct the current block.

(A13) In some embodiments of any of A1-A12: (i) the mapping is performed when the current block has a size that meets one or more criteria; and (ii) the mapping is not performed when the current block has a size that does not meet the one or more criteria. For example, the prediction angle mapping process may only be applied to certain block sizes. In some embodiments, the mapping is performed in accordance with a determination that the current block has a size that meets one or more criteria.

(A14) In some embodiments of any of A1-A13: (i) the mapping is performed when an indicator from the video bitstream indicates that mapping prediction angles is enabled for the current block; and (ii) the mapping is not performed when the indicator from the video bitstream indicates that mapping prediction angles is disabled for the current block. For example, a high-level syntax is signaled to indicate whether the wide-angle mapping process is allowed.

(A15) In some embodiments of any of A1-A14, the first range of angles corresponds to conventional angles and the second range of angles corresponds to wide angles.

(A16) In some embodiments of any of A1-A14, the second range of angles corresponds to conventional angles and the first range of angles corresponds to wide angles.

(A17) In some embodiments of any of A1-A16, mapping the set of intra prediction angles to the set of adjusted prediction angles comprises offsetting the set of intra prediction angles by 180 degrees to obtain the set of adjusted prediction angles (e.g., as illustrated in Code Snippet 1 above).

(A18) In some embodiments of any of A1 and A5-A17: (i) the current block has a square shape; (ii) the first range of angles corresponds to angles less than 45 degrees; and (iii) the second range of angles corresponds to angles greater than 45 degrees. For example, for square block, the 3 positive delta angles located at the right-hand (or clock-wise) side of 45 degrees nominal angle (sometimes referred to as D45_PRED) are mapped to the conventional angles which are located at the bottom-left to the 203 degrees nominal angle (sometimes referred to as D203_PRED) and its delta angles.

(A19) In some embodiments of any of A1 and A5-A18, the method further includes, when the current block has a square shape, mapping a nominal angle for the set of intra prediction angles to an adjusted nominal angle within the second range of angles. For example, the related nominal angle for these 3 delta angles (right of the 45 degrees angle) is also mapped to D203_PRED for primary and/or secondary transform related operations (e.g., transform kernel selection or context derivation for entropy coding of transform related syntaxes).

(A20) In some embodiments of any of A1 and A5-A18, the method further includes, when the current block has a square shape, mapping a nominal angle for the set of intra prediction angles to a set index for a transform operation for the current block. For example, when the primary and/or secondary transforms are grouped into sets with corresponding set indices and kernel indices within a set, the related nominal angle for these 3 delta angles is mapped to a set index for primary and/or secondary transform related operations.

(B1) In another aspect, some embodiments include a method (e.g., the method 650) of video encoding. In some embodiments, the method is performed at a computing system (e.g., the server system 112) having memory and control circuitry. In some embodiments, the method is performed at a coding module (e.g., the coding module 320). The method includes: (i) receiving video data (e.g., a source video sequence) comprising a plurality of blocks (e.g., corresponding to a set of pictures), including a current block; (ii) identifying a set of intra prediction angles for the current block, where the set of intra prediction angles corresponds to a first range of angles; (iii) mapping the set of intra prediction angles to a set of adjusted prediction angles based on a shape of a prediction block for the current block, where the set of adjusted prediction angles corresponds to a second range of angles outside of the first range of angles; and (iv) encoding the current block based on the adjusted prediction angles.

(C1) In another aspect, some embodiments include a method of visual media data processing. In some embodiments, the method is performed at a computing system (e.g., the server system 112) having memory and control circuitry. In some embodiments, the method is performed at a coding module (e.g., the coding module 320). The method includes: (i) obtaining a source video sequence that comprises a plurality of frames; and (ii) performing a conversion between the source video sequence and a video bitstream of visual media data according to a format rule. The video bitstream comprises a plurality of blocks including a current block. The format rule specifies that: (a) a set of intra prediction angles be identified for the current block, where the set of intra prediction angles corresponds to a first range of angles; (b) the set of intra prediction angles be mapped to a set of adjusted prediction angles based on a shape of a prediction block for the current block, where the set of adjusted prediction angles corresponds to a second range of angles outside of the first range of angles; and (c) the current block be decoded based on the adjusted prediction angles.

In another aspect, some embodiments include a computing system (e.g., the server system 112) including control circuitry (e.g., the control circuitry 302) and memory (e.g., the memory 314) coupled to the control circuitry, the one or more sets memory storing one or more sets of instructions configured to be executed by the control circuitry, the one or more sets of instructions including instructions for performing any of the methods described herein (e.g., A1-A20, B1, and C1 above).

In yet another aspect, some embodiments include a non-transitory computer-readable storage medium storing one or more sets of instructions for execution by control circuitry of a computing system, the one or more sets of instructions including instructions for performing any of the methods described herein (e.g., A1-A20, B1, and C1 above).

Unless otherwise specified, any of the syntax elements (e.g., indicators) described herein may be high-level syntax (HLS). As used herein, HLS is signaled at a level that is higher than a block level. For example, HLS may correspond to a sequence level, a frame level, a slice level, or a tile level. As another example, HLS elements may be signaled in a video parameter set (VPS), a sequence parameter set (SPS), a picture parameter set (PPS), an adaptation parameter set (APS), a slice header, a picture header, a tile header, and/or a CTU header.

It will be understood that, although the terms "first," "second," etc. may be used herein to describe various elements, these elements should not be limited by these terms. These terms are only used to distinguish one element from another. The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" can be construed to mean "when" or "upon" or "in response to determining" or "in accordance with a determination" or "in response to detecting" that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context.

The foregoing description, for purposes of explanation, has been described with reference to specific embodiments. However, the illustrative discussions above are not intended to be exhaustive or limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method of video decoding performed at a computing system having memory and one or more processors, the method comprising:

receiving a video bitstream comprising a plurality of blocks, including a current block;

identifying a set of intra prediction angles for the current block, wherein the set of intra prediction angles corresponds to a first range of angles;

mapping the set of intra prediction angles to a set of adjusted prediction angles based on a shape of a prediction block for the current block, wherein the set of adjusted prediction angles corresponds to a second range of angles outside of the first range of angles; and reconstructing the current block based on the adjusted prediction angles.

2. The method of claim 1, further comprising, when the current block has a non-square shape, mapping a nominal angle for the set of intra prediction angles to an adjusted nominal angle within the first range of angles.

3. The method of claim 2, wherein the current block has a height that is greater than a width of the current block, wherein the first range of angles corresponds to angles less than 90 degrees, and wherein the second range of angles corresponds to angles greater than 203 degrees.

4. The method of claim 2, wherein the current block has a width that is greater than a height of the current block, wherein the first range of angles corresponds to angles greater than 180 degrees, and wherein the second range of angles corresponds to angles less than 45 degrees.

5. The method of claim 2, wherein a parity corresponding to the nominal angle is unchanged by the mapping.

6. The method of claim 5, further comprising determining whether to apply an intra bi-prediction for the current block based on the parity corresponding to the nominal angle.

7. The method of claim 6, further comprising identifying a set of weighting factors based on one or more angles outside of the second range of angles; and wherein the current block is reconstructed using the intra bi-prediction and the set of weighting factors.

8. The method of claim 1, wherein the set of intra prediction angles correspond to a luma component of the current block, and a chroma component of the current block is reconstructed without mapping any intra prediction angles.

9. The method of claim 1, further comprising:

identifying a set of weighting factors for the set of intra prediction angles; and applying the set of weighting factors to the set of adjusted prediction angles.

10. The method of claim 1, wherein an intra bi-prediction mode is disabled for the set of adjusted prediction angles.

11. The method of claim 1, wherein reconstructing the current block based on the adjusted prediction angles comprises applying an intra bi-prediction for the current block using the adjusted prediction angles and reference samples within the current block.

12. The method of claim 1, wherein:

the mapping is performed when an adjacent reference is used to reconstruct the current block; and the mapping is not performed when a non-adjacent reference is used to reconstruct the current block.

13. The method of claim 1, wherein:

the mapping is performed when the current block has a size that meets one or more criteria; and the mapping is not performed when the current block has a size that does not meet the one or more criteria.

14. The method of claim 1, wherein:

the mapping is performed when an indicator from the video bitstream indicates that mapping prediction angles is enabled for the current block; and the mapping is not performed when the indicator from the video bitstream indicates that mapping prediction angles is disabled for the current block.

15. The method of claim 1, wherein the first range of angles corresponds to conventional angles and the second range of angles corresponds to wide angles.

16. The method of claim 1, wherein the second range of angles corresponds to conventional angles and the first range of angles corresponds to wide angles.

17. The method of claim 1, wherein mapping the set of intra prediction angles to the set of adjusted prediction angles comprises offsetting the set of intra prediction angles by 180 degrees to obtain the set of adjusted prediction angles.

18. The method of claim 1, wherein:

the current block has a square shape;

the first range of angles corresponds to angles less than 45 degrees; and the second range of angles corresponds to angles greater than 45 degrees.

19. A computing system, comprising:

control circuitry;

memory; and one or more sets of instructions stored in the memory and configured for execution by the control circuitry, the one or more sets of instructions comprising instructions for:

receiving video data comprising a plurality of blocks, including a current block;

identifying a set of intra prediction angles for the current block, wherein the set of intra prediction angles corresponds to a first range of angles;

mapping the set of intra prediction angles to a set of adjusted prediction angles based on a shape of a prediction block for the current block, wherein the set of adjusted prediction angles corresponds to a second range of angles outside of the first range of angles; and encoding the current block based on the adjusted prediction angles.

20. A non-transitory computer-readable storage medium storing one or more sets of instructions configured for execution by a computing device having control circuitry and memory, the one or more sets of instructions comprising instructions for:

obtaining a source video sequence that comprises a plurality of frames; and performing a conversion between the source video sequence and a video bitstream of visual media data according to a format rule, wherein the video bitstream comprises a plurality of blocks, including a current block; and wherein the format rule specifies that:

a set of intra prediction angles be identified for the current block, wherein the set of intra prediction angles corresponds to a first range of angles;

the set of intra prediction angles be mapped to a set of adjusted prediction angles based on a shape of a prediction block for the current block, wherein the set of adjusted prediction angles corresponds to a second range of angles outside of the first range of angles; and the current block be decoded based on the adjusted prediction angles.

* * * * *